United States Patent
Mantraratnam et al.

(10) Patent No.: US 10,346,556 B2
(45) Date of Patent: Jul. 9, 2019

(54) VALIDATION OF MULTI-COMPONENT DESIGN CONSTRAINTS FOR CAPITAL PROJECT DESIGN SYSTEM

(71) Applicant: Hexagon Technology Center GmbH, Heerbrugg (CH)

(72) Inventors: Venkata N. P. Mantraratnam, Madison, AL (US); Jealani P. Shaik, Madison, AL (US)

(73) Assignee: Hexagon Technolgy Center GmbH, Heerbrugg (CH)

( * ) Notice: Subject to any disclaimer, the term of this patent is extended or adjusted under 35 U.S.C. 154(b) by 435 days.

(21) Appl. No.: 15/163,825

(22) Filed: May 25, 2016

(65) Prior Publication Data
US 2017/0344666 A1 Nov. 30, 2017

(51) Int. Cl.
*G06F 17/50* (2006.01)
*G06Q 10/06* (2012.01)
*G06Q 50/04* (2012.01)
*G06Q 50/06* (2012.01)
*G06Q 50/08* (2012.01)

(52) U.S. Cl.
CPC ........... *G06F 17/50* (2013.01); *G06Q 10/063* (2013.01); *G06Q 50/04* (2013.01); *G06Q 50/06* (2013.01); *G06Q 50/08* (2013.01); *Y02P 90/30* (2015.11)

(58) Field of Classification Search
CPC ............................................ G06F 17/50–5095
See application file for complete search history.

(56) References Cited

U.S. PATENT DOCUMENTS

| | | | |
|---|---|---|---|
| 2006/0101368 A1* | 5/2006 | Kesarwani | G06F 17/5045 716/137 |
| 2010/0241477 A1* | 9/2010 | Nylander | G06F 17/5004 705/7.27 |
| 2014/0032426 A1 | 1/2014 | Tozzi | |
| 2015/0066442 A1 | 3/2015 | Pryor | |

(Continued)

FOREIGN PATENT DOCUMENTS

WO   WO 2013/019961 A2   2/2013

OTHER PUBLICATIONS

International Searching Authority, International Search Report—International Application No. PCT/US2017/033825, dated Jul. 26, 2017, together with the Written Opinion of the International Searching Authority, 15 pages.

*Primary Examiner* — Brian W Wathen
(74) *Attorney, Agent, or Firm* — Nutter McClennen & Fish LLP (57) ABSTRACT

A system, method, and executable program code are used to design a capital project having a plurality of components. An application programming interface receives, from one or more 3D design systems, design change data for a checked component in the plurality of components. One or more rules each provide a design constraint between the checked component and at least one other functionally-related reference component, the functional relationship being defined by an end user for the design of the specific capital project. A computing processor applies each of the rules to produce a determination whether the checked component satisfies the design constraint of the applied rule. Finally, data indicative of each such determination are stored in a database, for eventual transmission to one or more of the 3D design systems.

26 Claims, 5 Drawing Sheets

(56) References Cited

U.S. PATENT DOCUMENTS

| | | | |
|---|---|---|---|
| 2015/0088467 A1* | 3/2015 | Skoropinski | G06F 17/5004 |
| | | | 703/1 |
| 2016/0132805 A1 | 5/2016 | Delacourt et al. | |
| 2016/0246899 A1* | 8/2016 | Hirschtick | G06F 17/50 |
| 2016/0328496 A1* | 11/2016 | Mattson | G06F 17/5009 |
| 2017/0083638 A1* | 3/2017 | Suto | G06F 17/505 |

* cited by examiner

VALIDATION OF MULTI-COMPONENT DESIGN CONSTRAINTS FOR CAPITAL PROJECT DESIGN SYSTEM

FIELD OF THE INVENTION

The invention generally relates to a data processing system for validating a design of a machine or manufacture using one or more computer-aided design systems and, more particularly, the invention relates to indicating failure of a design change to satisfy a constraint of the machine or manufacture.

BACKGROUND OF THE INVENTION

Development, construction, and management of large-scale capital projects, such as power plants (e.g., a coal fueled power generation facility), capital ships (e.g., military shipping, cruise ships, or cargo ships), and off-shore oil platforms, requires coordination of processes and data on a scale that is orders of magnitude greater than those of smaller, common projects (e.g., building and selling a ten room house). Large-scale capital projects consequently often require a substantially more comprehensive production and management solution.

In response to this need, those skilled in the art have developed comprehensive 3D design programs (e.g., Smart-Plant® Enterprise, distributed by Intergraph, Inc. of Huntsville, Ala.) that are specially configured for the rigors of such large capital projects. Among other things, this type of design program (also referred to as a "plant program") can be implemented as a broad application suite that manages most or all phases of a large-scale capital project, from initial conception, to design, construction, handover, maintenance, management, and decommissioning.

For each design project, a data model stores information about various components of the project, and in particular inherent properties of various project components that are captured when the components are created or modified in the design. The patterns of such inherent properties are known ahead of time to the software developer. For example, the system will not permit two components to occupy the same physical volume, and a certain type of pre-programmed component (for example, a pipe) may be represented in the software as having certain physical attributes (for example, a maximum fluid flow rate) that may be customized by an end user.

It is often necessary for a user to ensure that various components of a capital project satisfy design constraints, of which there are two types: constraints on individual components, and constraints relating two or more components. It is known in the art to program CAD software to apply design constraints to individual components, and graphically indicate to the designer when such constraints are not met. Such programming is possible because constraints on individual components rely on those components' inherent properties, which are known in advance.

Validation of multi-component design constraints is, however, much more difficult. As an example, a designer may require (pursuant to a safety regulation, for example) that a valve must be reachable from a walkway such that it can be quickly and safely operated by an average-sized person in case of an emergency. This requirement places a constraint on the distance between the valve and the walkway. Such relationships are, by their nature, not inherent in the physical properties of either the valve or the walkway, and the requirements may vary based on legal jurisdiction (and are therefore subject to change at any time). Therefore, they cannot be reasonably programmed into the CAD software. A typical process plant may have thousands, or even millions of such constraints, which must be verified manually.

Compounding the problem, some projects such as power plants, by virtue of their complexity, may be designed by hundreds or thousands of individuals, or dozens or hundreds of teams working together on different aspects of the design, and each of these teams may have conflicting requirements for the components. For example, a chemical process plant may have a reaction system team, a mechanical systems team, an electrical system team, a security and safety team, and so on. If a particular component falls within the scope of work of multiple teams, a constraint synchronization problem may arise. Thus, if one team places a component according to its design constraints, a second team may reposition the component according to its own design constraints, thereby making the component defective from the perspective of the first team (which could rightfully assume that the issue had already been addressed, and might be upset to later learn otherwise). Due to such continuous ongoing modifications on components, the amount of rechecking needed for each modification is prohibitively costly. Therefore, such checks are usually done at certain stages in the modeling.

SUMMARY OF VARIOUS EMBODIMENTS

Various embodiments of the invention permit validation of multi-component design constraints without substantially impacting the performance of 3D design programs. In illustrative embodiments, a rules-based system confirms that a change to a component of a large scale project complies with prescribed design requirements involving that component. Each design requirement is analogous to a rule. For each rule, there are two scenarios; the first scenario is that the component being evaluated is, in this rule's viewpoint, a checked component and therefore the rule needs to find the functionally-related reference component(s) needed for it to comply with the prescribed design requirements of the rule. The second scenario is that the component being evaluated is, in this rule's viewpoint, a functionally-related reference component and therefore the rule needs to find the checked components it serves.

A first embodiment of the invention is a system for validating a design of a capital project having a plurality of components. The system includes a data communications port configured to receive, using an application programming interface, from one or more 3D design systems that design the capital project, design change data for a checked component in the plurality of components. The system includes also a storage, storing metadata pertaining to one or more rules, wherein each of the one or more rules defines a design constraint between the checked component and at least one other functionally-related reference component of the capital project. The system further includes a computing processor. The computing processor is configured to determine one or more rules pertaining to the checked component. The computing processor also is configured to apply each of the one or more rules to both (a) design change data of the checked component, and (b) design data, retrieved from the one or more 3D design systems, of the at least one other functionally-related reference component of said rule, wherein said applying produces a determination whether the checked component satisfies the design constraint of the applied rule. Finally, the computing processor is configured to store, in a database, data indicative of each such determination.

Variations on the first embodiment are contemplated. In one variant, the computing processor is further configured to direct the data communications port to transmit data, indicative of a design constraint unsatisfied by the checked component, to a 3D design system in the one or more 3D design systems, in response to receiving, from the 3D design system, a request for such data. In another variant, the computing processor is further configured to apply a rule by analyzing portions of the received design data and the design data of the at least one other functionally-related reference component. In yet another variant, the computing processor is further configured to apply a rule by dynamically determining the at least one other functionally-related reference component for which metadata for the rule defines a functional relationship with the checked component.

In still another variant, the computing processor is further configured to store in the database data that pertain to the at least one functionally-related reference component and that were used to apply the rule, such data referred to herein as "data of significance". In this variant, applying a rule may include accessing data of significance that were previously stored in the database in association with the rule, and omitting further processing of the rule if the data of significance have not changed since they were previously stored.

In a further variant, the computing processor is further configured to identify, at regular intervals, checked components whose design data have been deleted from the design, and remove from the database one or more unsatisfied design constraints associated with the identified checked components. In another variant, the computing processor is further configured to identify, at regular intervals, functionally-related reference components whose design data have been deleted from the design. In this variant, the computing processor is configured to (a) identify, for each such functionally-related reference component, which of the one or more rules provides a checked component to which the reference component is functionally-related; (b) reapply each identified rule to produce a determination whether the checked component still satisfies the design constraint of the identified rule; and (c) store, in the database, data indicative of each such determination.

A second embodiment of the invention is a computerized method of validating a design of a capital project having a plurality of components. The method includes using an application programming interface to receive, from one or more 3D design systems that design the capital project, design change data for a checked component in the plurality of components. The method also includes retrieving, from a storage, metadata pertaining to one or more rules, wherein each of the one or more rules defines a design constraint between the checked component and at least one other functionally-related reference component of the capital project. The method next includes applying, by a computing processor, each of the one or more rules to both (a) design change data of the checked component, and (b) design data, retrieved from the one or more 3D design systems, of the at least one other functionally-related reference component of said rule, wherein said applying produces a determination whether the checked component satisfies the design constraint of the applied rule. The method finally includes storing, in a database, data indicative of each such determination.

Variations on the second embodiment are contemplated. Thus, one variant includes transmitting data, indicative of a design constraint unsatisfied by the checked component, to a 3D design system in the one or more 3D design systems, in response to receiving, from the 3D design system, a request for such data. In another variant, applying a rule includes analyzing portions of the received design data and the design data of the at least one other functionally-related reference component. In yet another variant, applying a rule includes dynamically determining the at least one other functionally-related reference component for which metadata for the rule defines a functional relationship with the checked component.

A further variant includes storing data of significance in the database. In this variant, applying a rule may include accessing data of significance that were s previously stored in the database in association with the rule, and omitting further processing of the rule if the data of significance have not changed since they were previously stored.

A further variant includes identifying, at regular intervals, checked components whose design data have been deleted from the design, and removing from the database one or more unsatisfied design constraints associated with the identified checked components. An additional variant includes identifying, at regular intervals, functionally-related reference components whose design data have been deleted from the design. This variant also includes (a) identifying, for each such functionally-related reference component, which of the one or more rules provides a checked component to which the reference component is functionally-related; (b) reapplying each identified rule to produce a determination whether the checked component still satisfies the design constraint of the identified rule; and (c) storing, in the database, data indicative of each such determination.

Applying a rule may include evaluating a functional relation between components that: is spatial or temporal, or pertains to safe or effective or efficient operability of the capital project, or pertains to a process performed by, or property of any component of, the capital project that is mechanical, electrical, magnetic, thermal, audible, luminous, chemical, biological, or radiological in nature, or any combination of such functional relations.

A third embodiment of the invention is a non-transitory, computer-readable medium on which is stored program code that, when executed by a computing processor, performs the computerized method described above, or any of its variants.

A person having ordinary skill in the art should recognize that, while the above embodiments of, and variants on the system, method, and computer-readable medium are presented in the alternative, the features described in these embodiments and variants are interoperable, and other embodiments of the invention may include any combination of them.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, a rules-based system confirms that a change to a component of a large scale project complies with prescribed design requirements involving that component. Each design requirement is analogous to a rule. For each rule, there are two scenarios; the first scenario is that the component being evaluated is, in this rule's viewpoint, a checked component and therefore the rule needs to find the functionally-related reference component(s) needed for it to comply with the prescribed design requirements of the rule. The second scenario is that the component being evaluated is, in this rule's viewpoint, a functionally-related reference component and therefore the rule needs to find the checked components it serves.

To that end, the system receives, from one or more 3D design systems (e.g., using the application programming interface (API) or a data access layer of a 3D design program), design change data indicating a change of a component of a large scale project. In response, the system retrieves metadata encoding one or more rules that each define a design constraint between the changed component and at least one other functionally-related reference component of the project. Using the rules encoded by the metadata, the system determines if the relationship between the changed component and other component complies with the design rules. The system then applies the design rule(s) to determine whether the changed component satisfies the specified design constraint(s) of the rule(s). Finally, the system stores data indicative of that determination in a storage device, such as a database, and transmits the determination to one or more of the 3D design systems. A user or logic then may act on that determination to ensure compliance with the design constraints of the project. Details are discussed below.

Figure 1:
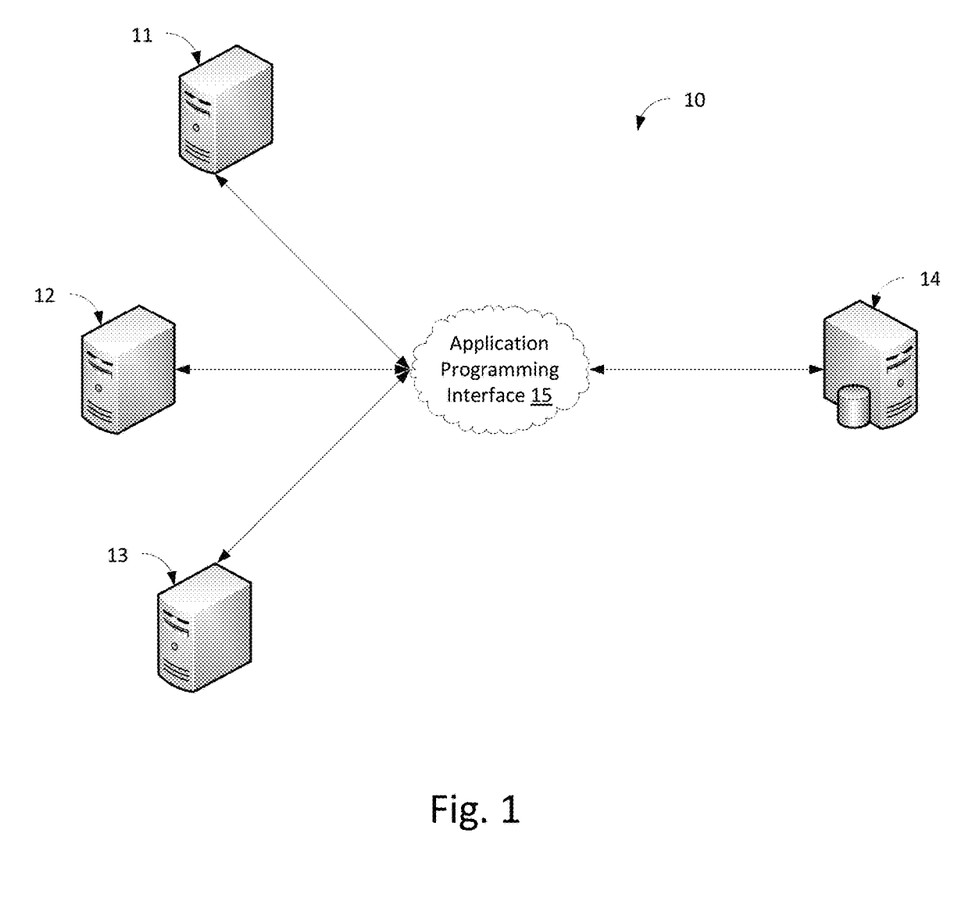
FIG. 1 schematically shows an environment containing a system embodiment of the invention.

FIG. 1 schematically shows an environment 10 containing a system embodiment of the invention. The environment 10 preferably is configured to design large-scale capital projects. The environment 10 thus includes one or more 3D design systems 11, 12, 13 that design the project. Such design may be cooperative. For example, with respect to a given capital project (e.g. a chemical process plant) having a single design data set, 3D design system 11 may be used by a structural engineer to access the data set, 3D design system 12 may be used by a chemical process engineer to access the data set, and 3D design system 13 may be used by an electrical engineer to access the data set. The 3D design systems 11, 12, 13 may be implemented using hardware that is known in the art, provided they are configured in accordance with the functions and processes described herein.

The environment 10 also includes a system embodiment of the invention, generally shown in FIG. 1 as a system 14. The system 14 may be implemented using hardware known in the art that is configured in accordance with the functions and processes described herein. Relevant functional components of such an implementation are noted below, shown in FIG. 2, and described in more detail below. Although shown as a single device, the system 14 may be implemented as a distributed system within a plurality of separate devices, or, in some embodiments, as a cloud service accessible by a network such as the Internet.

In accordance with illustrative embodiments, the system 14 provides a plurality of functions relating to multi-component design constraint checking for the data set manipulated by the 3D design systems 11, 12, 13. Specifically, among other things, the system 14 may have the following functions:

1) specifying rules for checking multiple-component design constraints, and signaling when a constraint is not satisfied;

2) detecting, storing, maintaining, and monitoring, monitors components for modifications that alter which components are considered "related" for purposes of multiple-component rules;

3) ensuring that the constraint checking process does not modify the component data;

4) identifying deleted functionally-related reference components, and rechecking the checked components to which they were related;

5) identifying "data of significance" that are used when evaluating design constraints. For example, if a particular constraint checks that a valve is reachable from a walkway, then the extents and position of the walkway are data of significance, but other data like thickness of the walkway, its fabrication material, and its designer-provided name are examples of data having no significance to the rule—modifications to such data do not need to invoke a recheck of the constraint; and 6) permitting a designer to specify that certain deviations from a design constraint are acceptable. For example, if the constraint is that a valve must be no more than 1.5 meters from a walkway, violation of a particular valve by a few centimeters may be manually flagged as a permissible exception.

The 3D design systems 11, 12, 13 communicate with the system 14 via an application programming interface (API) 15. The API 15 may be any combination of hardware or software, including a data access layer, that enables operation of the system as a whole, and may utilize any communications facility known in the art such as a data bus, a local area network (LAN), wide area network (WAN), virtual private network (VPN), the Internet, or any combination of these.

In accordance with illustrated embodiments, the 3D design systems 11, 12, and 13 access 3D model data pertaining to the portion of the project under design (e.g., a component or set of components, such as an electrical system or a valve), hereinafter called "design data". Such data include data that pertain to the physical and spatial aspects of each part of the portion of the project; for example, the size, position, and orientation of a part. Such access may be provided using any technique known in the art. For example, the design data may be stored in a database local to any of the 3D design systems 11, 12, 13, or as network attached storage (NAS), and 3D design systems 11, 12, 13 may access it using the API 15. Alternately, the design data may be stored in a storage area network (SAN).

Also in accordance with the illustrated embodiment, the system 14 may separately maintain a portion of the design data, together with metadata pertaining to and encoding one or more rules; these data are hereinafter called "rules metadata". Rules metadata are described in more detail below in connection with FIG. 2.

While FIG. 1 shows an environment 10 having a particular hardware configuration that is particularly suited to implementing a system embodiment of the invention, it should not be viewed as limiting. In particular, it is not necessary for the system 14 to be physically distinct from one or all of the 3D design systems 11, 12, 13, or for the system 14 to communicate with the 3D design systems 11, 12, 13 using the API 15. For example, the system 14 may operate as a service in a multi-tasking operating system that concurrently executes a 3D design program using a single computing device, for which the API 15 is a software interface between the service and the program. Those having ordinary skill in the art of computer systems design may contemplate other arrangements of hardware and software that fall within the scope of the invention, as set forth by the claims.

Figure 2:
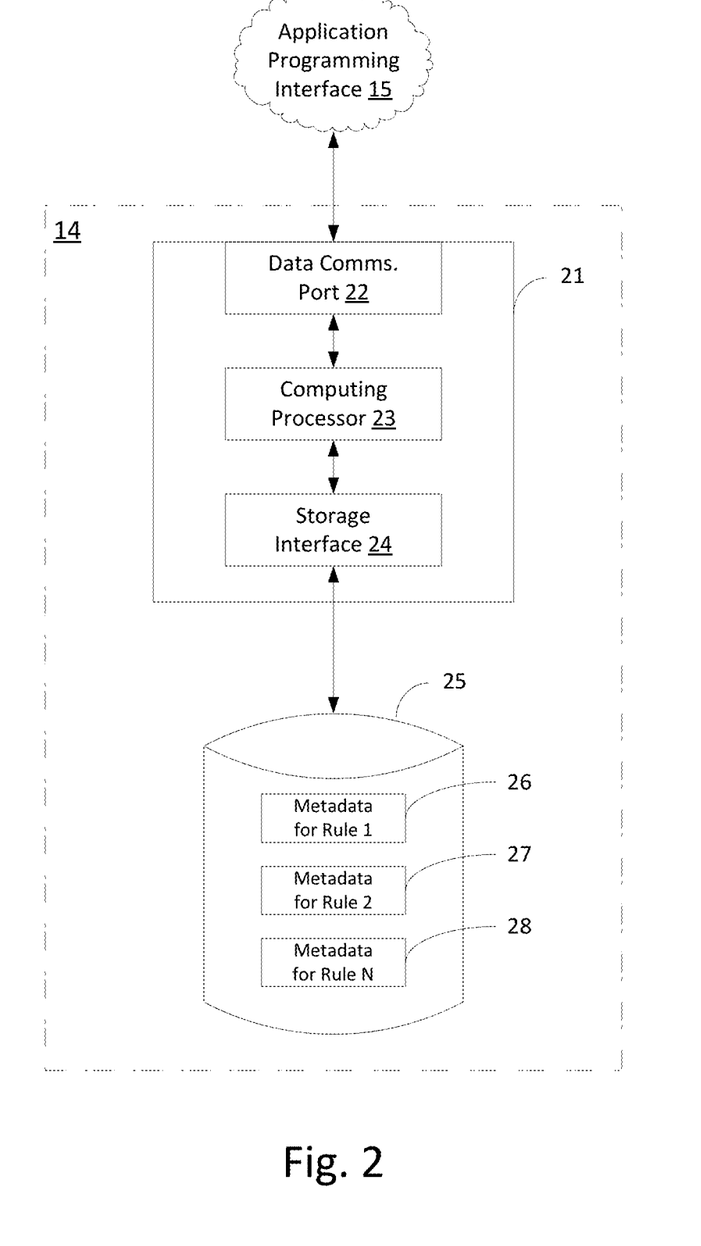
FIG. 2 schematically shows relevant physical components of the system embodiment of FIG. 1.

FIG. 2 schematically shows relevant physical components of the system 14 embodiment of FIG. 1. As before, the server 14 communicates with 3D design systems (not shown) via the noted API 15. The system 14 includes a housing 21, having a data communications port 22, a computing processor 23, and a storage interface 24. The system 14 also includes a storage 25, containing metadata 26, 27, 28 for one or more rules. These components are now described in more detail.

The housing 21 may be a computer server housing as known in the art. The housing 21 includes a data communications port 22 configured to receive, from one or more 3D design systems via the API 15, design change data for a component. "Design change data" are data that indicate a change to the design data of a component in the capital project under design. The data communications port 22 may be any port known in the art for communicatively coupling the system 14 to the API 15, and may be, for example, an Ethernet port.

The housing 21 also includes a computing processor 23, which may be a conventional central processing unit (CPU) as known in the art. The computing processor 23 retrieves, from the storage 25 via a storage interface 24, metadata for configuring one or more rules pertaining to a component. It then applies, one by one, each of the rules to design change data of the component. This application produces a determination, for each such checked component, whether the checked component satisfies the design constraint of the applied rule. The computing processor 23 then stores, in the database, data indicative of each such determination. The particular operations taken by the computing processor 23 on the design data are described in more detail in connection with FIGS. 3 and 5. The computing processor 23 may subsequently control the data communications port 22 to transmit data indicative of each such determination (and in particular, indicative of a design constraint unsatisfied by the checked component) back to one of the 3D design systems 11, 12, 13 via the API 15. This transmission may be responsive to receiving the design change data, or it may be responsive to receiving a separate request for the list of unsatisfied design constraints with respect to the particular checked component, or a collection of components.

The housing 21 includes a storage interface 24 for communicatively coupling the computing processor 23 to the storage 25. The storage interface 24 may be any combination of hardware, firmware, or software necessary to couple these components. The storage 25 may include any conventional database known in the art. For example, the storage 25 may include the ORACLE relational database management system (RDBMS) produced by Oracle Corporation of Redwood City, Calif. Or, the storage may include the public domain SQLite RDBMS developed by D. Richard Hipp. Alternately or in addition, the storage 25 may include any conventional filesystem known in the art. Thus, the storage interface 24 may include a database driver that is specific to a data format or data communications standard used by a database present in the storage 25, or a filesystem driver that is specific to a filesystem present in the storage 25.

Relevant to embodiments of the present invention, the storage 25 includes the noted metadata 26, 27, 28 that pertain to one or more rules. Each of the rules defines a design constraint between a first component and at least one other functionally-related reference component of the capital project under design. Thus, in accordance with illustrated embodiments of the invention, each such rule pertains to a multi-component design constraint.

It should be appreciated that the physical components of the system embodiment shown in FIG. 2 are merely exemplary, and that those having ordinary skill in the art of computer systems design may contemplate other arrangements of the physical components, or other physical components that might be included, within the scope of the invention.

Figure 3:
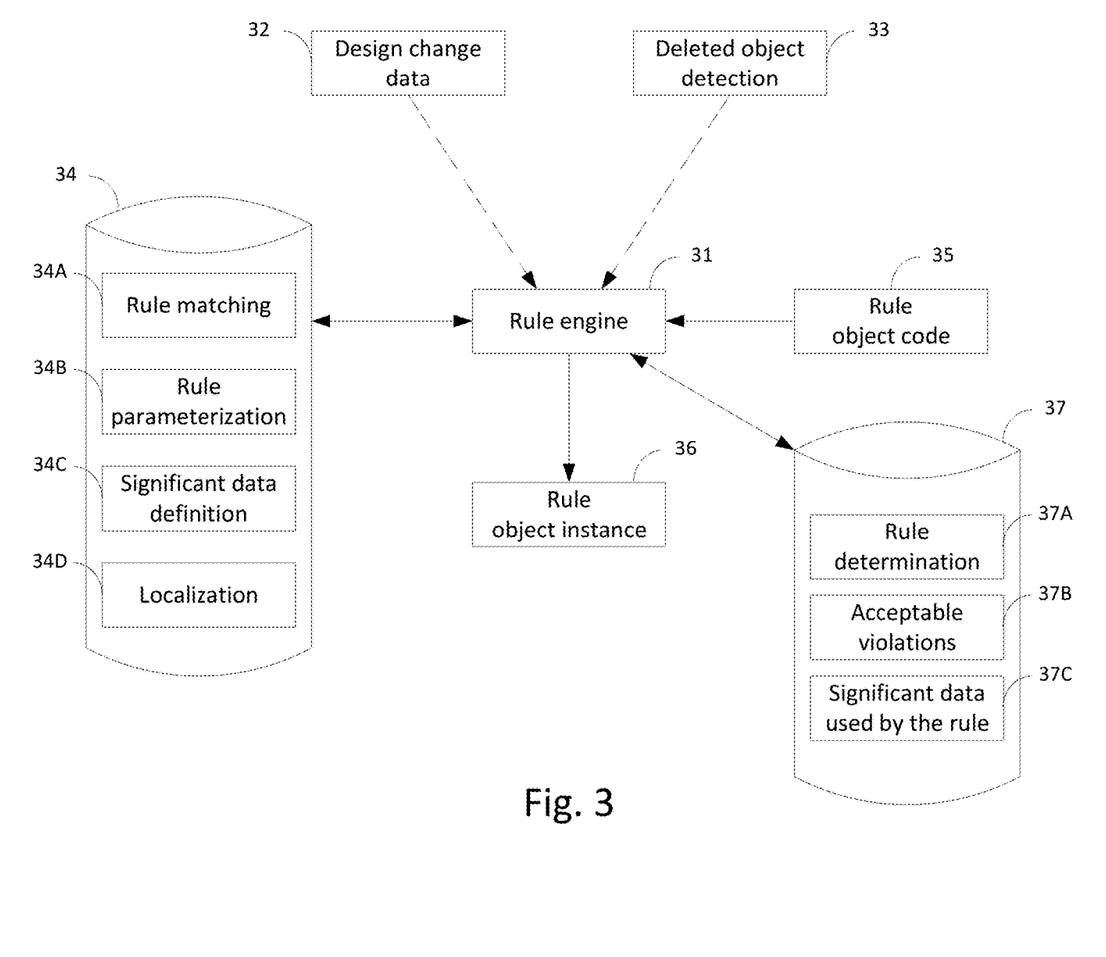
FIG. 3 schematically shows relevant logical components of the system embodiment of FIG. 1, and their functional relationships.

FIG. 3 schematically shows relevant logical components of the system embodiment of FIG. 1, and their functional relationships. The primary logical component is the rule engine 31, which may execute, for example, using the computing processor 23. The purpose of the rule engine 31 is to detect design components whose data have been created, changed, or deleted from the design, and to execute rules relating to these components to determine whether the changes are within constraints determined by a designer.

The rule engine 31 may be invoked in two different ways. First, the rule engine 31 may be invoked when the system 14 receives design change data 32 from one of the 3D design systems 11, 12, 13. For example, a designer may move a valve 0.5 meters in an X direction, and the designer's system communicates to the server data 32 pertaining to the changed valve design. In some embodiments, changes are aggregated by the design system in a change log, transaction log, journal, or other such list, and the rule engine 31 operates by downloading the change log and executing rules as a batch process. In these embodiments, the rule engine 31 may perform the batch processing either upon manual command, or on a regular schedule. In other embodiments, a design system actively communicates design change data 32 to the rule engine 31 as the changes are committed to the design. In one such embodiment, the rule engine 31 saves the design change data 32 to its own change log, for later batch processing as described above. In an alternate embodiment, the rule engine 31 processes such design change data 32 immediately. Because multiple designers may work on a design simultaneously, in the alternate embodiment issues of data coherence may occur, but may be addressed using methods known in the art. For the sake of concreteness, the description below assumes that the rule engine 31 is invoked using a batch processing mode; a person having ordinary skill in the art should appreciate how to implement a rule engine 31 in one of the other above-described configurations.

Second, the rule engine 31 may be invoked upon execution of a process 33 that checks for deleted functionally-related reference components. The operation of the process 33 is described below, once the purpose of each other logical component of FIG. 3 has been explained. The component identified in the invocation process, whether created, changed, or deleted, is hereinafter referred to as the "invoking component", and may be a checked component or a functionally-related reference component. Various embodiments of the invention advantageously permit rules to operate not just on invoking components (as was known in the art), but to connect them to functionally-related reference components.

Once the rule engine 31 has been invoked, it must determine for each change in the change log which rules apply to the invoking component, which is referenced in the design change data 32. For this purpose, it accesses metadata 34 pertaining to one or more rules. In accordance with one embodiment of the invention, these metadata are supplied as rule matching metadata 34A, which may be encoded using extensible markup language (XML), for example, or stored in a spreadsheet or other such mechanism.

To describe how the rule matching metadata 34A encode an assignment of rules to invoking components, several generalizations must be described. A first generalization is to recognize that components may be grouped into types. For example, there are many different instruments that can be placed on pipes: valves, flow gauges, temperature gauges, and so on. Thus, an embodiment of the invention may describe all such instruments as having the "PipeInstruments" type. With this generalization, the rule matching metadata 34A may be designed to instruct the rule engine 31 to evaluate specific rules whenever the design change data 32 specify any invoking component having the "PipeInstruments" type.

A second generalization is to recognize that the types themselves may be arranged into a hierarchy. Thus, one may define top-level types of "Systems", "Structure", "Piping", and so on. The "Piping" type may then be divided into various sub-types; for example, the above-mentioned "PipeInstruments" may be one sub-type, while another subtype might be "PipeSpecialties", and so on. This generalization permits the rule designers to logically organize rules into a corresponding hierarchy.

A third generalization is to recognize that an object type may have several design constraints to evaluate, which means it may have multiple rules. Thus, applying different rules to each object type ensures that each object of that type can comply with many different design requirements.

With these generalizations in mind, the rule engine 31 of one embodiment determines rules to evaluate with respect to invoking components using two processes, as follows. First, for each invoking component, the rule engine 31 determines a particular type to which that component belongs, for example by consulting a database lookup table. Second, it searches the rule matching metadata 34A to determine a number of rules that are associated with that particular type. While the number of rules is often a positive number, it may be that the number of rules is zero, if there are no particular design constraints that must be satisfied by a particular type of component. The rules are thus determined to apply to the invoking component.

To facilitate design of a capital project having multi-component relational design constraints, a designer may define various rules for ensuring that those constraints are met. Rules are implemented using rule object code 35. "Object code", as used herein, means a software "object" or "class" (as those terms are used in the art of object-oriented programming) that provides instructions to a computing processor for evaluating a rule. In accordance with various embodiments of the invention, a rule describes one or more relations between an invoking component and one or more related components. A relation between these components may be completely general in nature; by way of example, it may be spatial or temporal, or pertain to safe or effective or efficient operability of the capital project, or pertain to a process performed by, or property of any component of, the capital project that is mechanical, electrical, magnetic, thermal, audible, luminous, chemical, biological, or radiological in nature, or any combination of such functional relations.

It should be appreciated that rules may be parameterized to provide reuse and flexibility. For example, a certain rule may be designed to compare a distance between an invoked component and a functionally-related reference component against an acceptable value; such a rule has general utility. By considering the type of invoked component, the type of functionally-related reference component, and the acceptable value to be rule parameters, the rule object code 35 for the rule may be adapted to any number of situations. Thus, the rule may be adapted to ensure that a valve (invoking component) is always within a human-reachable distance (acceptable value) of a walkway (reference component). The human-reachable distance itself might vary based on locality; the average height of humans varies between countries, for example. By separating the rule parameterization metadata 34B from the rule object code 35, the evaluation of a rule thus may be advantageously varied without the need to recode the rule.

Parameterization of rules may be implemented by encoding the types of invoking component, functionally-related reference component, and acceptable value(s) in rule parameterization metadata 34B. The encoding may be in XML, or any other suitable encoding format. It should be appreciated that the above description of parameters is minimal; more general parameters may be specified, and the parameterization function is completely general. Indeed, as rules may be implemented using the full power of an appropriate programming language, the types of design constraints that may be checked by a multi-component rule are unlimited, and may be arbitrarily complex, using any number of parameters. So long as appropriate rule parameterization metadata 34B are provided, the flexibility of the system is maintained. Thus, for example, while the rule matching metadata 34A may indicate that a particular rule is to be evaluated on a type of invoking component, the rule parameterization metadata 34B may indicate that it applies only to certain subtypes.

The invoking component, from the rule's perspective, can be a checked component or a functionally-related reference component. In the case of it being a checked component, the rule evaluates and identifies one or more functionally-related reference component(s) expected for satisfying the design constraint. In the case it is a functionally-related reference component, the rule evaluates whether the design change data pertain to "data of significance" from the rule's perspective. If so, the rule saves the new data of significance and identifies checked components affected by this design change and finally re-evaluates the identified checked components, one by one. If not, however, the rule may immediately cease further processing. Thus, in illustrative embodiments, significant data definition metadata 34C exists for this purpose.

Suppose, however, that the design change data 32 represent an invoking component for which data of significance were changed. After the rule engine 31 has determined which rules apply to a given invoking component, it must configure the rule object code 35 for each such rule. The rule object code 35 reads the corresponding rule parameterization metadata 34B to create a rule object instance 36.

With respect to rule evaluation, there are two possible outcomes: either the design change data 32 satisfy all of the conditions specified by the rule, or they do not. To be more precise, each rule may detect one or more design defects, and evaluation of the rule determines how many of these defects are detected. If that number of defects is zero, then the design change conforms to the design parameters; while if the number of defects is positive, the change does not conform to the design parameters, and an error condition occurs.

For example, a rule may require that a checked component is functionally-related to a reference component. One possible outcome is that the design system does not contain any functionally-related reference component at all. This defect may occur when the checked component is created before its functionally-related reference component, or when the latter component is deleted. Another possible outcome is that the design system contains one or more potentially related reference components, but none of them satisfy the design constraint defined by the rule. This defect is a separate error condition, that may be reported differently. A third possible outcome is that the design system contains one or more potentially related reference components, and multiple such components satisfy the design constraint. The rule may process all of the potentially related reference components it found, and decide to use the best one among them. It is a success condition if the rule finds one related reference component it needs.

To provide additional flexibility with respect to the reporting of error conditions, localization metadata 34D may be provided. The localization metadata 34D may specify, for each rule, the text (in a local language) to provide to a capital project designer if a constraint is met or not met. Thus, consider the case of a valve that must be reachable by a human from a walkway. One possible error condition that may be detected by the rule is that no walkway is within reach. Another possible error condition is that the distance between the valve and an associated walkway has changed due to repositioning (or deletion) of either the valve or walkway, and thus the valve is either too close or too far to be reachable. The localization metadata 34D may indicate, for each possible return value, text to be displayed to the design engineer.

Once the rule object instance 36 has been created, the rule engine 31 instructs it to apply to rule to the checked component and its functionally-related reference components. The outputs of such an application are determinations whether the checked component satisfies the design constraint of the rule. Data indicative of these determinations 37A for each such rule may then be cached or permanently stored in a rule results repository 37 for later access by one or more 3D design systems, or by other computer systems. Particular data 37A that may be stored in the rule results repository 37 include, for example: a named type of design constraint or defect checked by the rule, a textual description of the defect, an indication of the checked component, an indication of the list of functionally-related reference components used in reaching the result, and the result itself. These results may be later transmitted to a designer for review. To provide an additional optimization, rule object instances 36 may be cached in memory, so that repeated rule invocations do not require repeated database accesses.

Additionally, the rule results repository 37 may store indications 37B of design constraint violations that are acceptable in some fashion to a designer. For example, many engineering projects permit design tolerances with respect to the functional relationships between design components. Therefore, to the extent that a designer has reviewed a constraint violation, the designer may designate in the rule results repository 37 as data 37B that a particular violation as acceptable within a design tolerance (that is itself specified in adequate detail in the repository). If such a designation is made, the system will not further indicate that a violation occurred. This is also true during constraint rechecks: to the extent that a recheck of the constraint results in a similar violation, the fact that the designation has already been made, as indicated by its presence in the rule results repository 37, operates to prevent the system from flagging that constraint again to the designer.

For example, a certain valve may be required to exist within 1.5 meters above a walkway to provide reachability, but the design calls for the valve to be placed 1.502 meters above the nearest walkway. Upon an initial indication that the constraint has been violated, a designer may designate the violation as being within tolerance. A subsequent change that moves the valve horizontally, while it remains exactly 1.502 meters above (a different portion of) the walkway, will not cause the system to flag a violation of the same constraint.

Additionally, to enable the optimization pertaining to data of significance definition metadata 34C, the rule results repository 37 may also include data of significance 37C stored in association with a particular rule determination 37A. Such data pertain to at least one functionally-related reference component defined by metadata 34C in connection with a given rule, and were used by the rule object instance 36 to reach the rule determination 37A. The optimization may be performed by each rule object instance 36. Thus, the rule object instance 36 may, prior to performing significant computation or significant access to the 3D design systems, first access the data of significance 37C that were previously stored in the database in association with the rule implemented by that instance. Then, the instance may omit further processing if the data of significance have not changed since they were previously stored. Whether the data of significance have changed may be determined, in turn, by keeping track of the components that have triggered the rule invocation in the first instance. Thus, if the functionally-related reference component used by a rule has not appeared in the change log to invoke a rule, clearly its data have not changed at all. However, if the functionally-related reference component has appeared, a simple query to the design system can determine whether its significant data have changed. By this optimization, further computationally-intensive processing might be avoided advantageously.

With these features in mind, a description is now provided of the process 33 that checks for deleted components. This process 33 runs occasionally, whether on a timed, regular basis, at configurable times, or in an ad hoc manner. The process 33 identifies a listing of checked components and functionally-related reference components associated with unsatisfied design constraints, obtained from the rule results repository 37. When run, each object in this listing is matched to see if the component still exists in the design. If a component in the listing doesn't exist anymore in the design, the process 33 adds it to a listing of deleted objects.

When the listing of deleted objects is complete, it is evaluated one component at a time. The deleted component could be a checked component, in which case the associated design constraint(s) are removed from the database. However, if the deleted component is a functionally-related reference component for some checked components, the rule uses the last saved reference object data to arrive at a listing of checked objects affected by this deleted reference object, and any design constraints for those checked components that relied on the presence of the deleted reference object are reevaluated.

An example of the operation of the process 33 is now provided. A valve may be constrained to be placed within 1.5 meters of a walkway. If the valve and walkway are both present in the design and meet this constraint, there is no problem. However, if the walkway is relocated (or deleted entirely from the design), it may no longer be available to act as a functionally-related reference component for the valve; therefore, the rule defining the constraint between the valve and the walkway must be reevaluated. If no new walkway is discovered that can act as a functionally-related reference component for the valve, the checked component (i.e., the valve) will have become defective, even though its own design data did not change. Without the operation of the process 33, this defect may have gone unrecognized by the designers of the capital project (especially since the valve may have been previously evaluated under the same rule at a time when it satisfied the constraint, as indicated by an entry in the rule results repository 37).

Figure 4:
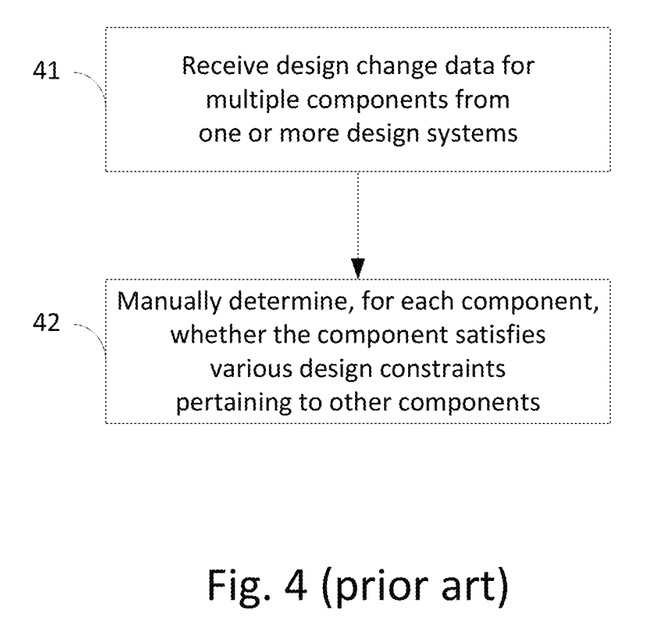
FIG. 4 is a flowchart illustrating a computerized method of validating a design of a capital project having a plurality of components, according to the prior art.
Figure 5:
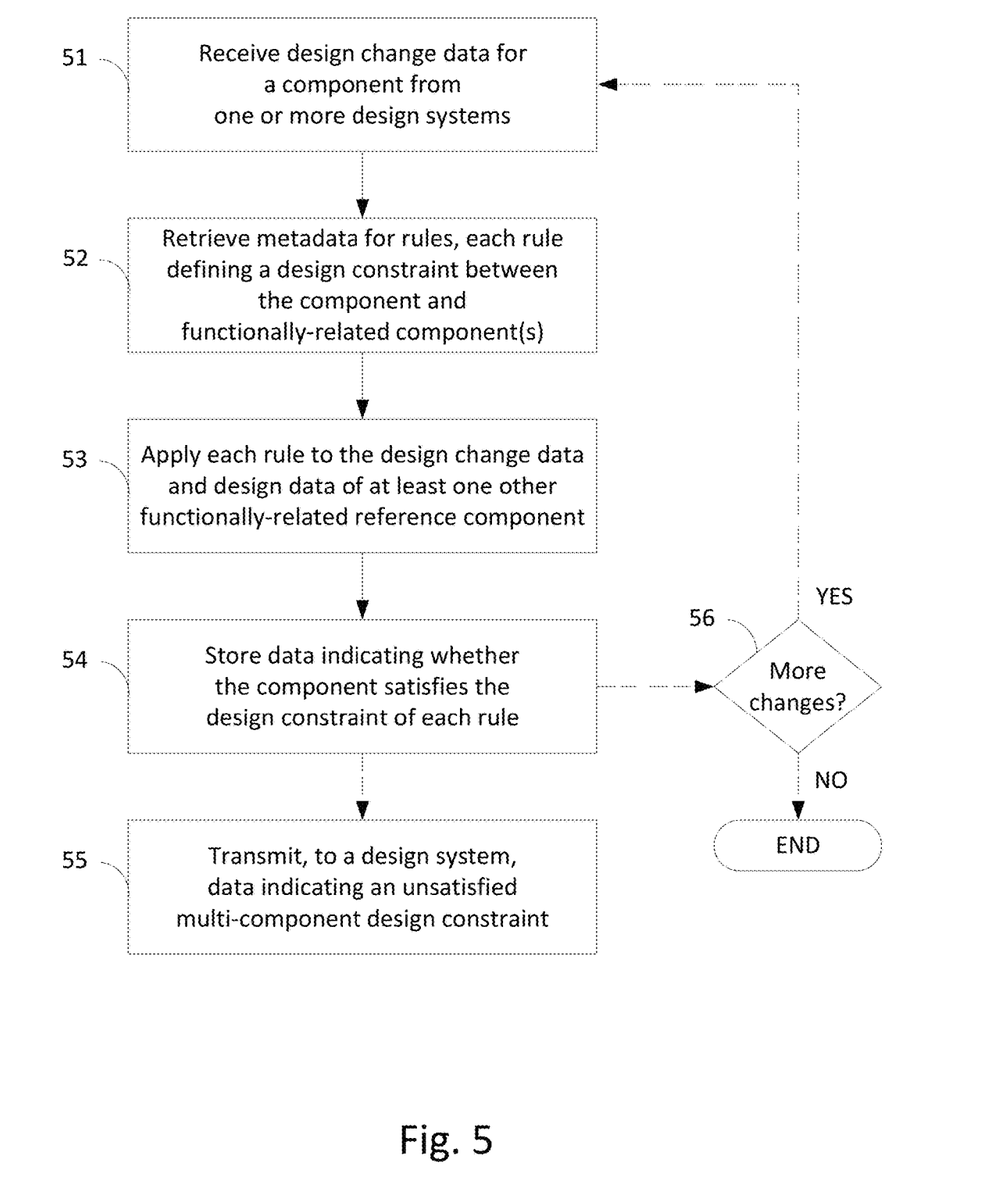
FIG. 5 is a flowchart illustrating an improved computerized method of validating a design of a capital project having a plurality of components, according to an embodiment of the invention.

An illustration of the advantages of various embodiments of the invention may be further appreciated with reference to FIGS. 4 and 5. FIG. 4 is a flowchart illustrating a computerized method of validating a design of a capital project having a plurality of components, according to the prior art. In a first process 41, the prior art method receives design change data for multiple components from one or more 3D design systems. In a second process 42, the a verification designer manually determines, for each component, whether the component satisfies various design constraints pertaining to other component. As noted in the background section, such manual verification can be an enormous undertaking, given the sheer number of components and number of design constraints in a typical large-scale capital project, and verification often acts as a final review process before achievement of design milestones may be certified.

FIG. 5 is a flowchart illustrating an improved computerized method of validating a design of a capital project having a plurality of components, according to an embodiment of the invention. By contrast to the prior art method shown in FIG. 4, the method shown in FIG. 5 may be performed at any time, and need not act as an impediment to certifying that a design milestone has been achieved. However, if such a certification is required, the illustrated process fulfills this requirement. The method may be performed, for example, by the rules engine 31 executing on the computing processor 23, in communication with metadata 34 stored in the storage 25.

The method begins with a first process 51, in which a design constraint system receives, from one or more 3D design systems, design change data for a component. As indicated above, this invoking component may be a checked component in its own right, or it may be a functionally-related reference component that is functionally related to a checked component or components.

The method continues with a second process 52, in which the design constraint system retrieves, from a database, metadata pertaining to one or more rules, wherein each of the one or more rules defines a design constraint between the checked component and at least one other, functionally-related reference component, identified by the rule's processing, as described above.

A computing processor then performs process 53, applying each of the one or more rules to both (a) the design change data of the checked component, and (b) design data, retrieved from a 3D design system, of the at least one other functionally-related reference component. This application of the rules produces a determination whether the checked component satisfies the design constraint of each rule individually.

In a process 54, the method stores, in the database, data indicative of each such determinations. At a later time, the method may include a process 55, which requires transmitting, to a 3D design system, data indicative of a design constraint unsatisfied by the checked component. Such transmitting may be automatic in response to receiving the design change data in process 51, or it may be in response to receiving a later request (for example, during a milestone verification process). In the latter case, it is likely that further design change data may be received before the transmitting process 55, in which case the method determines, in a process 56, whether more changes are forthcoming from the designer. If not, the method ends, while if additional changes to the design are made by designers, the method returns to process 51 in which these changes are received.

Although the above discussion discloses various exemplary embodiments of the invention, it should be apparent that those skilled in the art can make various modifications that will achieve some of the advantages of the invention without departing from the true scope of the invention.

It should be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Various embodiments of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

What is claimed is:

1. A system for validating a design of a capital project having a plurality of components, the system comprising:
    a data communications port configured to receive, using an application programming interface, from one or more 3D design systems that design the capital project, design change data for a checked component in the plurality of components;
    a storage, storing metadata pertaining to one or more rules, wherein each of the one or more rules defines a design constraint between the checked component and a functionally-related reference component of the capital project, the design constraint relating to a functional relationship between the checked component and the functionally-related reference component, which functional relationship is not inherent in properties of either the checked component or the functionally-related reference component; and
    a computing processor configured to:
        identify the functionally-related reference component,
        determine one or more rules pertaining to the functional relationship between the checked component and the functionally-related reference component,
        apply each of the one or more rules to both (a) design change data of the checked component, and (b) design data, retrieved from the one or more 3D design systems, of the functionally-related reference component of said rule, wherein said applying produces a determination whether the checked component satisfies the design constraint of the applied rule, and
        store, in a database, data indicative of each such determination.

2. The system as defined by claim 1, wherein the computing processor is further configured to direct the data communications port to transmit data, indicative of a design constraint unsatisfied by the checked component, to a 3D design system in the one or more 3D design systems, in response to receiving, from the 3D design system, a request for such data.

3. The system as defined by claim 1, wherein the computing processor is further configured to apply a rule by analyzing portions of the received design change data and the design data of the functionally-related reference component.

4. The system as defined by claim 1, wherein the computing processor is further configured to apply a rule by dynamically determining the functionally-related reference component for which metadata for the rule defines a functional relationship with the checked component.

5. The system as defined by claim 1, wherein the computing processor is further configured to store in the database data that pertain to the functionally-related reference component and that were used to apply the rule, such data referred to herein as "data of significance".

6. The system as defined by claim 5, wherein applying a rule includes:
    accessing data of significance that were previously stored in the database in association with the rule; and
    omitting further processing of the rule if the data of significance have not changed since they were previously stored.

7. The system as defined by claim 1, wherein the computing processor is further configured to:
    identify, at regular intervals, checked components whose design data have been deleted from the design; and
    remove from the database one or more unsatisfied design constraints associated with the identified checked components.

8. The system as defined by claim 1, wherein the computing processor is further configured to:
    identify, at regular intervals, functionally-related reference components whose design data have been deleted from the design;
    identify, for each such functionally-related reference component, which of the one or more rules provides a checked component to which the reference component is functionally-related;
    reapply each identified rule to produce a determination whether the checked component still satisfies the design constraint of the identified rule; and
    store, in the database, data indicative of each such determination.

9. A computerized method of validating a design of a capital project having a plurality of components, the method comprising:
    using an application programming interface to receive, from one or more 3D design systems that design the capital project, design change data for a checked component in the plurality of components;

retrieving, from a storage, metadata pertaining to one or more rules, wherein each of the one or more rules defines a design constraint, the design constraint relating to a functional relationship between the checked component and a functionally-related reference component, which functional relationship is not inherent in properties of either the checked component or the functionally-related reference component;

applying, by a computing processor, each of the one or more rules to both (a) design change data of the checked component, and (b) design data, retrieved from the one or more 3D design systems, of the functionally-related reference component of said rule, wherein said applying produces a determination whether the checked component satisfies the design constraint of the applied rule; and storing, in a database, data indicative of each such determination.

10. The method as defined by claim 9, further comprising transmitting data, indicative of a design constraint unsatisfied by the checked component, to a 3D design system in the one or more 3D design systems, in response to receiving, from the 3D design system, a request for such data.

11. The method as defined by claim 9, wherein applying a rule includes analyzing portions of the received design change data and the design data of the functionally-related reference component.

12. The method as defined by claim 9, wherein applying a rule includes dynamically determining the functionally-related reference component for which metadata for the rule defines a functional relationship with the checked component.

13. The method as defined by claim 9, further comprising storing in the database data that pertain to the functionally-related reference component and that were used to apply the rule, such data referred to herein as "data of significance".

14. The method as defined by claim 13, wherein applying a rule includes:
accessing data of significance that were previously stored in the database in association with the rule; and
omitting further processing of the rule if the data of significance have not changed since they were previously stored.

15. The method as defined by claim 9, further comprising:
identifying, at regular intervals, checked components whose design data have been deleted from the design; and
removing from the database one or more unsatisfied design constraints associated with the identified checked components.

16. The method as defined by claim 9, further comprising:
identifying, at regular intervals, functionally-related reference components whose design data have been deleted from the design;
identifying, for each such functionally-related reference component, which of the one or more rules provides a checked component to which the reference component is functionally-related;
reapplying each identified rule to produce a determination whether the checked component still satisfies the design constraint of the identified rule; and
storing, in the database, data indicative of each such determination.

17. The method as defined by claim 9, wherein applying a rule includes evaluating a functional relation between components that: is spatial or temporal, or pertains to safe or effective or efficient operability of the capital project, or pertains to a process performed by, or property of any component of, the capital project that is mechanical, electrical, magnetic, thermal, audible, luminous, chemical, biological, or radiological in nature, or any combination of such functional relations.

18. A non-transitory, computer-readable medium on which is stored program code that, when executed by a computing processor, performs a computerized method of validating a design of a capital project having a plurality of components, the method comprising:
using an application programming interface to receive, from one or more 3D design systems that design the capital project, design change data for a checked component in the plurality of components;
retrieving, from a storage, metadata pertaining to one or more rules, wherein each of the one or more rules defines a design constraint, the design constraint relating to a functional relationship between the checked component and a functionally-related reference component, which functional relationship is not inherent in properties of either the checked component or the functionally-related reference component of the capital project;
applying, by the computing processor, each of the one or more rules to both (a) design change data of the checked component, and (b) design data, retrieved from the one or more 3D design systems, of the functionally-related reference component of said rule, wherein said applying produces a determination whether the checked component satisfies the design constraint of the applied rule; and
storing, in a database, data indicative of each such determination.

19. The medium as defined by claim 18, further comprising program code for transmitting data, indicative of a design constraint unsatisfied by the checked component, to a 3D design system in the one or more 3D design systems, in response to receiving, from the 3D design system, a request for such data.

20. The medium as defined by claim 18, wherein the program code for applying a rule includes program code for analyzing portions of the received design change data and the design data of the functionally-related reference component.

21. The medium as defined by claim 18, wherein the program code for applying a rule includes program code for dynamically determining the functionally-related reference component for which metadata for the rule defines a functional relationship with the checked component.

22. The medium as defined by claim 18, further comprising program code for storing in the database data that pertain to the functionally-related reference component and that were used to apply the rule, such data referred to herein as "data of significance".

23. The medium as defined by claim 22, wherein the program code for applying a rule includes program code for:
accessing data of significance that were previously stored in the database in association with the rule; and
omitting further processing of the rule if the data of significance have not changed since they were previously stored.

24. The medium as defined by claim 18, further comprising program code for:
identifying, at regular intervals, checked components whose design data have been deleted from the design; and removing from the database one or more unsatisfied design constraints associated with the identified checked components.

25. The medium as defined by claim 18, further comprising program code for:
- identifying, at regular intervals, functionally-related reference components whose design data have been deleted from the design;
- identifying, for each such functionally-related reference component, which of the one or more rules provides a checked component to which the reference component is functionally-related;
- reapplying each identified rule to produce a determination whether the checked component still satisfies the design constraint of the identified rule; and
- storing, in the database, data indicative of each such determination.

26. The medium as defined by claim 18, wherein the program code for applying a rule includes program code for evaluating a functional relation between components that: is spatial or temporal, or pertains to safe or effective or efficient operability of the capital project, or pertains to a process performed by, or property of any component of, the capital project that is mechanical, electrical, magnetic, thermal, audible, luminous, chemical, biological, or radiological in nature, or any combination of such functional relations.

* * * * *